US011204909B2

(12) United States Patent
Welch et al.

(10) Patent No.: US 11,204,909 B2
(45) Date of Patent: Dec. 21, 2021

(54) INTERNAL TABLES FOR ACCESSING DATA STORED IN A DATABASE

(71) Applicant: SAP SE, Walldorf (DE)

(72) Inventors: Timothy Welch, Derry, NH (US); Andrew Ushakov, Boston, MA (US); Shuqing Cao, Newton, MA (US); Ashutosh Kulkarni, Pune (IN); Shyam Sunder Reddy Avula, San Ramon, CA (US); Ajit Sabnis, Westford, MA (US); Meena Ramakrishnan, Acton, MA (US)

(73) Assignee: SAP SE, Walldorf (DE)

( * ) Notice: Subject to any disclaimer, the term of this patent is extended or adjusted under 35 U.S.C. 154(b) by 314 days.

(21) Appl. No.: 16/174,824

(22) Filed: Oct. 30, 2018

(65) Prior Publication Data
US 2020/0034463 A1 Jan. 30, 2020

Related U.S. Application Data

(60) Provisional application No. 62/703,794, filed on Jul. 26, 2018.

(51) Int. Cl.
*G06F 16/22* (2019.01)
*G06F 16/245* (2019.01)

(52) U.S. Cl.
CPC ........ *G06F 16/2282* (2019.01); *G06F 16/245* (2019.01)

(58) Field of Classification Search
None
See application file for complete search history.

(56) References Cited

U.S. PATENT DOCUMENTS

| | | | | |
|---|---|---|---|---|
| 6,088,732 A | * | 7/2000 | Smith | H04L 29/06 709/226 |
| 6,460,043 B1 | * | 10/2002 | Tabbara | G06F 16/2452 |
| 9,813,502 B1 | * | 11/2017 | Chen | G06F 16/221 |
| 2008/0133491 A1 | * | 6/2008 | Iwao | G06F 16/256 |
| 2009/0254532 A1 | * | 10/2009 | Yang | G06F 16/221 |
| 2010/0223237 A1 | * | 9/2010 | Mishra | G06F 9/30178 707/693 |
| 2011/0145313 A1 | * | 6/2011 | Narayanan | H04L 69/04 709/203 |
| 2012/0109908 A1 | * | 5/2012 | Barsness | G06F 16/21 707/693 |

(Continued)

*Primary Examiner* — Irene Baker
(74) *Attorney, Agent, or Firm* — Mintz Levin Cohn Ferris Glovsky and Popeo, P.C.

(57) ABSTRACT

A method for transferring data from a database may include receiving, at a database management system, a request to transfer, to a client, at least a portion of data stored at a database coupled with the database management system. The database management system may respond to the request by at least generating an internal table containing at least the portion of the data being transferred to the client. The database management system may further transfer at least the portion of the data to the client by at least sending, to the client, one or more data chunks. Each of the one or more data chunks may include at least a portion of a column of data from the internal table. Related systems and articles of manufacture, including computer program products, are also provided.

18 Claims, 11 Drawing Sheets

(56) References Cited

U.S. PATENT DOCUMENTS

| | | | |
|---|---|---|---|
| 2015/0249727 A1* | 9/2015 | Luna | H04L 67/2828 |
| | | | 709/247 |
| 2015/0271232 A1* | 9/2015 | Luby | H04L 67/02 |
| | | | 709/231 |
| 2016/0041906 A1* | 2/2016 | Mukherjee | G06F 16/2379 |
| | | | 711/119 |
| 2016/0098420 A1* | 4/2016 | Dickie | G06F 16/2365 |
| | | | 707/693 |
| 2016/0147748 A1* | 5/2016 | Florendo | G06F 16/2282 |
| | | | 707/809 |
| 2017/0147618 A1* | 5/2017 | Geissinger | G06F 16/221 |
| 2017/0255675 A1* | 9/2017 | Chavan | G06F 7/24 |
| 2018/0063281 A1* | 3/2018 | Velusamy | H04L 67/327 |
| 2018/0089261 A1* | 3/2018 | Li | G06F 16/2456 |

* cited by examiner

Data Chunk 210A
Header 220B
Metadata 230
Dictionary Header 265
Global Dictionary 260
Null Vector 250

Data Chunk 210B
Header 220B
Global Dictionary 260

Data Chunk 210C
Header 220B
Global Dictionary 260

Data Chunk 210D
Header 220B
Index 270
Null Vector 250

Data Chunk 210E
Header 220B
Index 270
Null Vector 250

Data Chunk 210F
Header 220B
Index 270
Null Vector 250

FIG. 2B

Data Chunk 210A
Header 220C
Metadata 230
Index 285A
Local Dictionary 280A

Data Chunk 210B
Header 220C
Index 285B
Local Dictionary 280B

Data Chunk 210C
Header 220C
Index 285C
Local Dictionary 280C

Data Chunk 210D
Header 220C
Index 285D
Local Dictionary 280D

Data Chunk 210E
Header 220C
Index 285E
Local Dictionary 280E

Data Chunk 210F
Header 220C
Index 285F
Local Dictionary 280F

FIG. 2C

| Size | Name | Description |
|---|---|---|
| 4-bytes | Column Number | The column this block belongs to. |
| 4-bytes | Number of Rows | The number of rows contained in this block. |
| 4-bytes | Null Vector Offset | The offset to the beginning of the null vector. |

| Size | Name | Description |
|---|---|---|
| 2-bytes | Number of Entries | The number of entries in the dictionary. If a column has more than 64K distinct values, then either the value array or local dictionary should be used. This value has no relationship to the number of rows in the result. |
| 1-byte | Size of length | Variable length columns are prefixed by a length. This is the number of bytes the length is stored in. |
| 4-bytes | Dictionary length | The total length of the dictionary. This is the length of the dictionary itself and does not include data chunk header, column metadata, nor the dictionary header. |

| Size | Name | Description |
|---|---|---|
| 4-bytes | Column Number | The column this block belongs to. |
| 4-bytes | Number of Rows | The number of rows contained in this block. |
| 4-bytes | Null Vector Offset | The offset to the beginning of the null vector. |

| Size | Name | Description |
|---|---|---|
| 4-bytes | Column Number | The column this block belongs to. |
| 4-bytes | Number of Rows | The number of rows contained in this block. |
| 4-bytes | Number of Entries | The number of entries in the local dictionary. This is a count of the distinct values in this data chunk, not the distinct values in the table or the result. |

FIG. 3E

INTERNAL TABLES FOR ACCESSING DATA STORED IN A DATABASE

CROSS REFERENCE TO RELATED APPLICATION

This application claims priority to U.S. Provisional Application No. 62/703,794 filed on Jul. 26, 2018 and entitled "INNER TABLES FOR ACCESSING DATA STORED IN A DATABASE," the disclosure of which is incorporated herein by reference in its entirety.

TECHNICAL FIELD

The subject matter described herein relates generally to database processing and more specifically to accessing data stored in a database.

BACKGROUND

Data stored in a database may be organized into one or more database objects. For example, a relational database may store data in one or more tables. The relationships between different tables may be representative of the relationships that exists amongst the data stored in the relational database. By contrast, a non-relational database may store data as aggregates of documents, columns, key-value pairs, and/or graphs. The database may be coupled with a database management system (DBMS) that supports a variety of operations for accessing the data held in the database. For instance, to provide access to the data stored in the database, the database management system may support structured query language (SQL) statements and/or an application programming interface (API) including a web-enabled application programming interface such as, for example, a representational state transfer (RESTful) application programming interface and/or the like. Alternatively and/or additionally, one or more stored procedures available at the database may be invoked in order to access the data stored in the database.

SUMMARY

Systems, methods, and articles of manufacture, including computer program items, are provided for a fuzzy database queries. In one aspect, there is provided a system. The system may include at least one data processor and at least one memory. The at least one memory may store instructions that cause operations when executed by the at least one data processor. The operations may include receiving, at a database management system, a request to transfer, to a client, data stored at a database coupled with the database management system. An internal table containing the data being transferred to the client may be generated in response to the request. The data may be transferred to the client by at least sending, to the client, one or more data chunks. Each of the one or more data chunks may include at least a portion of a column of data from the internal table. Each of the one or more data chunks may include at least a portion of a dictionary and/or an index based at least on the request indicating that the data transferred to the client is to be compressed.

In some variations, one or more features disclosed herein including the following features can optionally be included in any feasible combination. At least some of the one or more data chunks may include a value array comprising the column of data from the internal table based at least on the request indicating that the data transferred to the client is to be uncompressed.

In some variations, the column of data may be compressed by at least generating a dictionary and an index. The dictionary may enumerate one or more unique values appearing in the column of data. The index may identify one or more rows occupied by each of the one or more unique values.

In some variations, the dictionary may be a global dictionary enumerating every unique value that appear in the column of data. The one or more data chunks may include a first data chunk and a second data chunk. The first data chunk may include at least a portion of the global dictionary. The second data chunk may include at least a portion of the index.

In some variations, the dictionary may include a first local dictionary and a second local dictionary. The first local dictionary may enumerate unique values appearing in a first data chunk from the one or more data chunks. The second local dictionary may enumerate unique values appearing in a second data chunk from the one or more data chunks. The first data chunk may include the first local dictionary and a first index identifying rows occupied by the unique values enumerated in the first local dictionary. The second data chunk may include the second local dictionary and a second index identifying rows occupied by the unique values enumerated in the second local dictionary.

In some variations, a first data chunk and a second data chunk from the one or more data chunks may include data from a first column of data in the internal table. A third data chunk from the one or more data chunks may include data from a second column of data in the internal table. The third data chunk may be sent to the client prior to the second data chunk in order to enable a formation of a complete row of data from the internal table.

In some variations, a data chunk may be sent to the client upon determining that the data chunk is full.

In some variations, the request may include a structured query language (SQL) query and/or an invocation of a stored procedure at the database management system. At least the portion of the data may include a projection of one or more tables stored at the database.

In another aspect, there is provided a method. The method may include receiving, at a database management system, a request to transfer, to a client, data stored at a database coupled with the database management system. An internal table containing the data being transferred to the client may be generated in response to the request. The data may be transferred to the client by at least sending, to the client, one or more data chunks. Each of the one or more data chunks may include at least a portion of a column of data from the internal table. Each of the one or more data chunks may include at least a portion of a dictionary and/or an index based at least on the request indicating that the data transferred to the client is to be compressed.

In some variations, one or more features disclosed herein including the following features can optionally be included in any feasible combination. At least some of the one or more data chunks may include a value array including the column of data from the internal table based at least on the request indicating that the data transferred to the client is to be uncompressed.

In some variations, the method may further include compressing the column of data by at least generating a dictionary and an index. The dictionary may enumerate one or more unique values appearing in the column of data. The index may identify one or more rows occupied by each of the one or more unique values.

In some variations, the dictionary may be a global dictionary enumerating every unique value that appear in the column of data. The one or more data chunks may include a first data chunk and a second data chunk. The first data chunk may include at least a portion of the global dictionary. The second data chunk may include at least a portion of the index.

In some variations, the dictionary may include a first local dictionary and a second local dictionary. The first local dictionary may enumerate unique values appearing in a first data chunk from the one or more data chunks. The second local dictionary may enumerate unique values appearing in a second data chunk from the one or more data chunks. The first data chunk may include the first local dictionary and a first index identifying rows occupied by the unique values enumerated in the first local dictionary. The second data chunk may include the second local dictionary and a second index identifying rows occupied by the unique values enumerated in the second local dictionary.

In some variations, a first data chunk and a second data chunk from the one or more data chunks may include data from a first column of data in the internal table. A third data chunk from the one or more data chunks may include data from a second column of data in the internal table. The third data chunk may be sent to the client prior to the second data chunk in order to enable a formation of a complete row of data from the internal table.

In some variations, the method may further including sending a data chunk to the client upon determining that the data chunk is full.

In some variations, the request may include a structured query language (SQL) query and/or an invocation of a stored procedure at the database management system. At least the portion of the data may include a projection of one or more tables stored at the database.

In another aspect, there is provided a computer program product that includes a non-transitory computer readable medium. The non-transitory computer readable medium may store instructions that result in operations when executed by at least one data processor. The operations may include receiving, at a database management system, a request to transfer, to a client, data stored at a database coupled with the database management system. An internal table containing the data being transferred to the client may be generated in response to the request. The data may be transferred to the client by at least sending, to the client, one or more data chunks. Each of the one or more data chunks may include at least a portion of a column of data from the internal table. Each of the one or more data chunks may include at least a portion of a dictionary and/or an index based at least on the request indicating that the data transferred to the client is to be compressed.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to internal tables for accessing data stored in a database, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2B depicts a column of data that is transferred using a global dictionary, in accordance with some example embodiments;

FIG. 2C depicts a column of data that is transferred using one or more local dictionaries, in accordance with some example embodiments;

FIG. 3B depicts a table illustrating an example of the contents of a header included in data chunks containing at least a portion of a value array, in accordance with some example embodiments;

FIG. 3C depicts a table illustrating an example of the contents of a dictionary header included in data chunks containing at least a portion of a global dictionary, in accordance with some example embodiments;

FIG. 3D depicts a table illustrating an example of the contents of a header included in data chunks containing at least a portion of a global dictionary and/or a corresponding index, in accordance with some example embodiments;

FIG. 3E depicts a table illustrating an example of the contents of a header included in data chunks containing data compressed using a local dictionary, in accordance with some example embodiments;

When practical, similar reference numbers denote similar structures, features, or elements.

DETAILED DESCRIPTION

Figure 1:
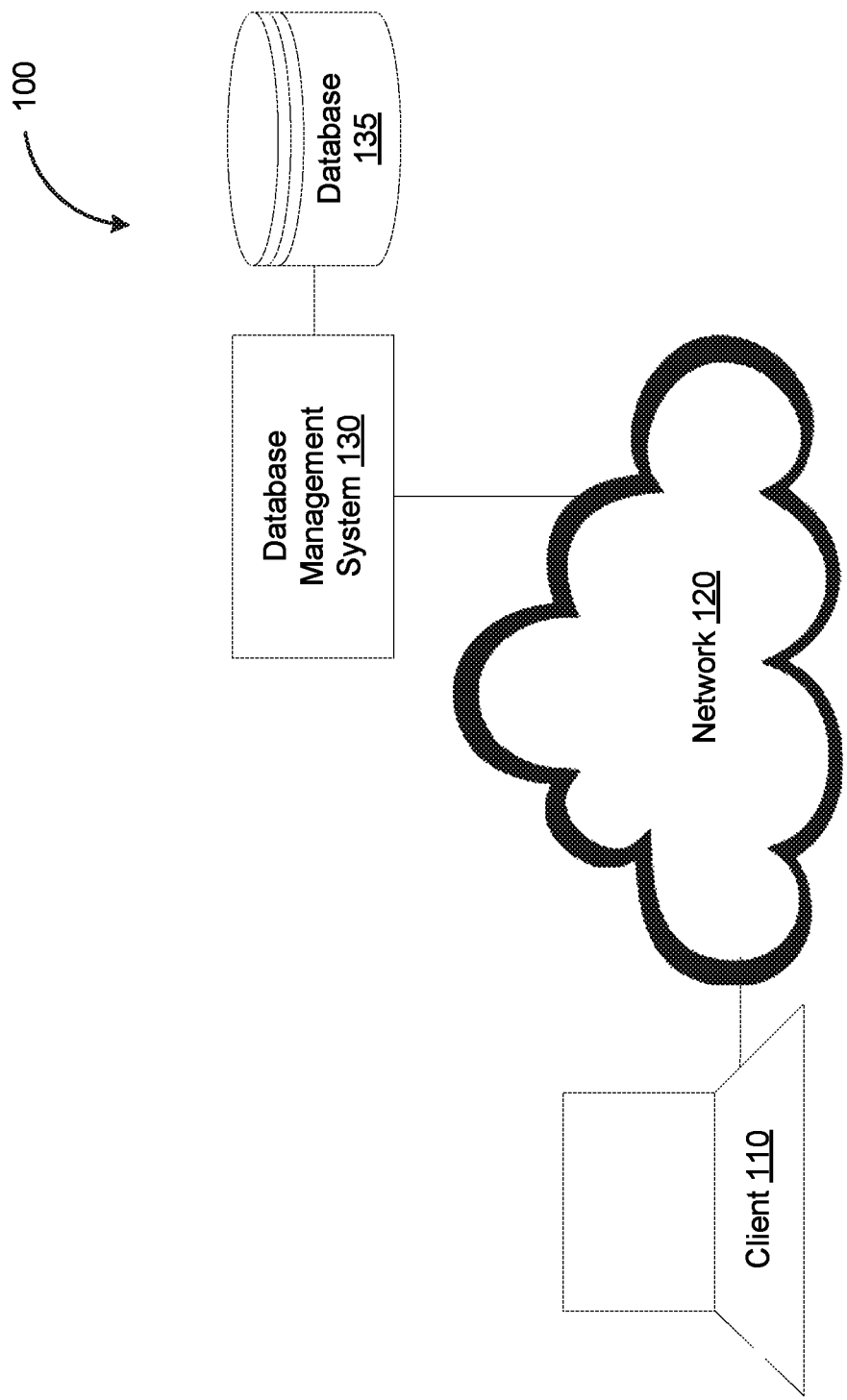
FIG. 1 depicts a system diagram illustrating a database system, in accordance with some example embodiments.

At least a portion of the data stored in a database may be transferred from the database to an endpoint such as, for example, a client, a server, another database, and/or the like. For example, data from an in-memory database may be transferred to a disk-based database due to the data aging, a relocation of one or more tables, and/or a join operation combining tables from the in-memory database and the disk-based database. However, using conventional application programming interfaces (e.g., open database connectivity (ODBC) and/or the like) and/or structured query language (SQL) statements (e.g., SQL SELECT and/or the like) to transfer data may be excessively time consuming, especially when large quantities of data are being transferred from the database. As such, in some example embodiments, an internal table may hold data that is being transferred from a database to an endpoint (e.g., a client, a server, another database, and/or the like). In order to transfer the data from the database to the endpoint, one or more data chunks, each of which containing at least a portion of a column from the internal table, may be sent from the database to the endpoint.

In some example embodiments, an internal table may be generated to hold data that is being transferred from a database to an endpoint including, for example, a client, a server, another database, and/or the like. To transfer the data from the database to the endpoint may include sending, to the endpoint, one or more columns of data from the internal table. As noted, a column may be sent to the endpoint in one or more data chunks, each of which containing at least a portion of the column. Furthermore, the columns that are sent to the endpoint may be compressed, for example, by applying dictionary compression and/or another compression technique. Accordingly, each column in the internal table may be sent to the endpoint as one or more dictionaries and corresponding indices. Alternatively and/or additionally, the columns that are sent to the endpoint may remain uncompressed. For example, the columns from the internal table may be sent to endpoint as a value array storing values from every row in the columns of the internal table.

In some example embodiments, the dictionary for a column from an internal table may enumerate the unique values appearing in at least a portion of that column. For example, the dictionary for the column may be a global dictionary that enumerates every unique value appearing in the column. Alternatively and/or additionally, the dictionary for the column may be a local dictionary that enumerates the unique values appearing in a portion of the column. For instance, each column from the internal table may be sent to from a database to an endpoint in one or more data chunks. As noted, a single data chunk may contain at least a portion of a column from the internal table. Accordingly, a data chunk may include a local dictionary enumerating the unique values that appear in the portion of the column contained in that data chunk.

In some example embodiments, the data may be transferred from a database to an endpoint (e.g., a client, a server, another database, and/or the like) in a synchronized mode and/or an unsynchronized mode. As noted, transferring the data from the database to the endpoint may include sending, to the endpoint, one or more data chunks. Each data chunk may contain at least a portion of a column from an internal table generated to hold the data. Data from the database may be transferred to the endpoint in a synchronized mode when the endpoint is performing a processing task that operates on one row of data at a time. For example, transferring the data in a synchronized mode may include sending, to the endpoint, a data chunk from each column in the internal table, even when those data chunks are only partially full. Doing so may ensure that the endpoint is able to form at least one complete row of data upon receiving a certain quantity of data chunks. By contrast, transferring the data in an unsynchronized mode may include sending, to the endpoint, full data chunks regardless of the order in which the columns from the internal table arrive at the endpoint. Data may be transferred in an unsynchronized mode in order to minimize the overhead associated with transferring data in a synchronized mode.

FIG. 1 depicts a system diagram illustrating a database system 100, in accordance with some example embodiments. Referring to FIG. 1, the database system 100 may include a client 110 that is communicatively coupled, via a network 120, with a database management system (DBMS) 130. It should be appreciated that the client 110 may be any type of endpoint including, for example, a database and/or a database management system coupled with a database. Furthermore, the client 110 may be any processor and memory based device including, for example, a cellular phone, smart phone, a tablet, a laptop computer, a desktop, a workstation, a server, and/or the like. Meanwhile, the network 120 may be any wired and/or wireless network including, for example, a public land mobile network (PLMN), a local area network (LAN), a wide area network (WAN), a virtual local area network (VLAN), the Internet, and/or the like.

Referring again to FIG. 1, the database management system 130 may be coupled with a database 135, which may be any type of database including, for example, a graph database, an in-memory database, a relational database, a non-SQL (NoSQL) database, and/or the like. In some example embodiments, the database management system 130 may be configured to transfer, to the client 110, at least a portion of the data stored at the database 135. For example, the database 135 may store data in one or more tables. The rows of a table may correspond to individual records and/or tuples whereas the columns of the table may correspond to the attributes associated with each record and/or tuple. Accordingly, the client 110 (and/or another entity) may request to transfer a projection that includes some but not all of the attributes stored in the database 135. This projection may also be a table that includes some but not all of the columns from the tables stored in the database 135. It should be appreciated that the request may be a structured query language (SQL) statement such as, for example, a SQL SELECT statement and/or the like. Alternatively and/or additionally, the client 110 (and/or the other entity) may request to transfer of at least the portion of the data stored at the database 135 by at least invoking a stored procedure. As used herein, a stored procedure may refer to a subroutine stored at the database 135, for example, in a data dictionary associated with the database 135. The stored procedure may thus be invoked by at least sending, to the database management system 130, a SQL statement such as, for example, a SQL CALL statement and/or the like.

In some example embodiments, the request from the client 110 may specify one or more parameters for transferring at least the portion of the data stored at the database 135. For example, the request from the client 110 may indicate whether and/or how the data being transferred from the database 135 to the client 110 should be compressed. However, it should be appreciated that the database management system 130 may not necessarily compress the data transferred from the database 135 to the client 110 in the manner requested by the client 110. When left uncompressed, the data may be transferred to the client 110 in the form of a value array. By contrast, the client 110 may also request for the data to be compressed using a global dictionary and/or a local dictionary. Alternatively and/or additionally, the client 110 may also specify whether the data should be transferred in a synchronized mode or in an unsynchronized mode. Transferring the data in a synchronized mode may include sending, to the endpoint, a data chunk from each column in the internal table, including data chunks that are only partially full, in order to ensure that the endpoint is able to form at least one complete row of data upon receiving a certain quantity of data chunks. By contrast, transferring the data in an unsynchronized mode may include sending, to the endpoint, full data chunks regardless of the order in which the columns from the internal table arrive at the endpoint. As noted, transferring data in an unsynchronized mode may incur less overhead than transferring data in a synchronized mode.

In some example embodiments, the database management system 130 may respond to the request from the client 110 by at least generating an internal table for holding the data that is being transferred to the client 110. The internal table may include a same quantity of columns as the projection requested by the client 110. To transfer the internal table to the client 110, the database management system 130 may transfer the internal table as one or more columns of data. For example, an internal table having an x quantity of columns may be transferred to the client 110 in a y quantity of columns. At least some of the y quantity of columns transferred to the client 110 may hold data from the internal table. Alternatively and/or additionally, at least one of the y quantity of columns transferred to the client 110 may hold a summary of the data from the internal table. For instance, the summary of the data may include a JavaScript Object Notation (JSON) description of the data that is being transferred to the client 110 including, for example, any errors that may be present in the data. It should be appreciated that the quantity of columns in the internal table may correspond to the processing capabilities of the client 110 and/or the processing tasks that are being performed by the client 110. As such, the data that arrives at the client 110 may be useable without any alterations by the client 110, for example, to change the quantity of columns.

In some example embodiments, the database management system 130 may transfer the data requested by the client 110 by at least sending, to the client, one or more data chunks, each of which containing at least a portion of a column from the internal table. The columns that are sent to the client 110 may be compressed, for example, by applying dictionary compression and/or another compression technique. Accordingly, the database management system 130 may send a column from the internal table to the client 110 by at least sending, to the client 110, one or more dictionaries and corresponding indices for that column. Alternatively and/or additionally, the database management system 130 may send, to the client 110, one or more columns from the internal table without applying any compression. For example, the database management system 130 may send a column from the internal table to the client 110 by at least sending, to the client 110, a value array storing values from every row in that column of the internal table.

As noted, a column from the internal table may be sent to the client 110 as one or more dictionaries and corresponding indices. It should be appreciated a dictionary for the column may enumerate the unique values appearing in at least a portion of the column. For example, the column may be associated with a global dictionary enumerating every unique value appearing in the column. Alternatively and/or additionally, the column may be associated with multiple local dictionaries, each of which enumerating the unique values appearing in a portion of the column. For instance, the database management system 130 may send, to the client 110, the column from the internal table in one or more data chunks. Accordingly, a single data chunk may include a portion of the column including, for example, a local dictionary enumerating the unique values that appear in the portion of the column included in that data chunk. In some example embodiments, a global dictionary may be used for compressing a column of data based at least on the availability of a preexisting dictionary at the database 135. The preexisting dictionary may be generated prior to the request from the client 110, for example, as part of storing one or more tables at the database 135. By contrast, a local dictionary may be used for compressing a column of data in the absence of a preexisting dictionary. A local dictionary may be built dynamically, for example, by the database management system 130 in response to the request from the client 110 to transfer at least a portion of the data stored at the database 135.

The client 110 may perform a processing task that operates on one row of data at a time. As such, in some example embodiments, the database management system 130 may transfer the data requested by the client 110 in a synchronized mode. Transferring data to the client 110 in a synchronized mode may include sending, to the client 110, a data chunk from each column in the internal table, even when those data chunks are only partially full. For example, a data chunk containing data from a subsequent column in the internal table may be sent to the client 110 before another data chunk containing data from a same column in the internal table. Accordingly, transferring data in a synchronized mode may ensure that the client 110 is able to form at least one complete row of data upon receiving a certain quantity of data chunks. For example, if the internal table includes an x quantity of columns, then the database management system 130 may send, to the client 110, a data chunk from each of the x quantity of columns such that the client 110 is able to form at least one complete row of data from the internal table upon receiving an x quantity of data chunks from the database management system 130. Moreover, the client 110 may be guaranteed to receive, from the database management system 130, data from a next row of data in the internal table within an x quantity of data chunks.

Alternatively and/or additionally, the database management system 130 may transfer the data requested by the client 110 in an unsynchronized mode. Transferring data to the client 110 in an unsynchronized mode may include sending, to the client 110, a data chunk only when that data chunk is full. The database management system 130 may send data chunks to the client 110 regardless of the order in which the columns from the internal table arrive at the client 110. Thus, when the database management system 130 is transferring data in an unsynchronized mode, the data chunks are not sent in a manner to ensure that the client 110 is able to form a complete row of data upon receiving a certain quantity of data chunks from the database management system 130. It should be appreciated that transferring data in a synchronized mode may impose significant overhead. For instance, sending partially full data chunks instead of full data chunks may incur greater input/output (I/O) cost because partially full data chunks tend to have a lower compression rate than full data chunks. The input/output cost associated with ending partially full data chunks may be further increased due to the header that is included in each partially full data chunk. As such, the data management system 130 may transfer data in an unsynchronized mode in order to minimize the overhead associated transferring data in a synchronized mode.

As noted, the client 110 may request to transfer at least a portion of the data stored at the database 135. For instance, the client 110 may request to transfer a projection of one or more tables stored at the database 135. The database management system 130 may respond to the request by at least sending, to the client 110, one or more data chunks, each of which containing at least a portion of a column from the internal table generated for holding the data requested by the client 110. For instance, in some example embodiments, each data chunk may include a header and metadata as well as at least a portion of a dictionary and/or an index for a column of data from the internal table. However, it should be appreciated that a data chunk may include a header and metadata but not a dictionary, an index, and/or data from the internal table. The format for each data chunk may vary depending on whether the data in the column is compressed as well as the type of dictionary (e.g., global dictionary or local dictionary) used to compress the data in the column. For example, the data chunks transferring a column of data that is compressed using a global dictionary and/or a local dictionary may have a different format than the data chunks transferring a value array corresponding to an uncompressed column of data. While dictionary compression may be used to compress the data in the column, it should be appreciated that other compression techniques (e.g., Lempel-Ziv-Welch compression and/or the like) may also be used to compress the data in the column.

Figure 2A:
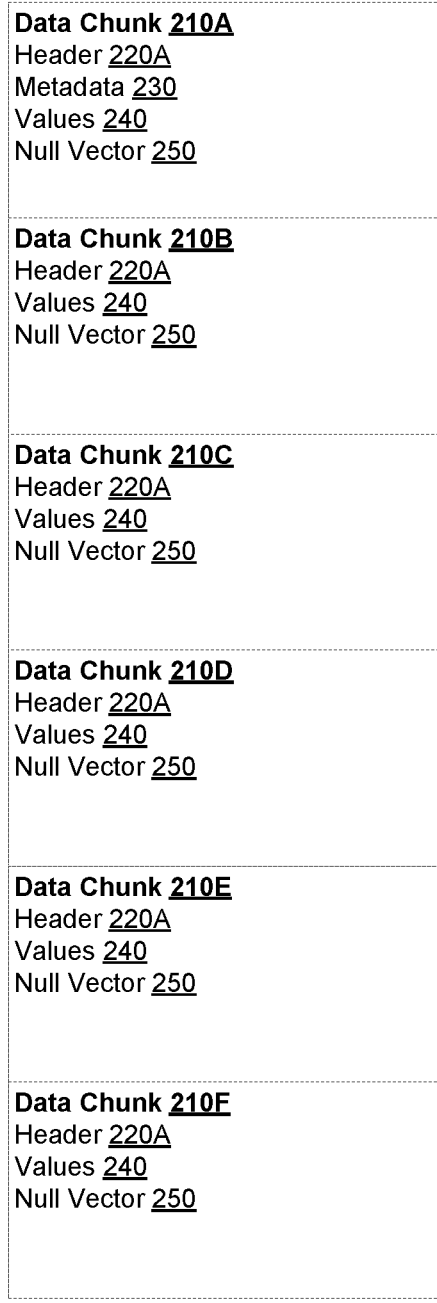
FIG. 2A depicts a column of data that is transferred as a value array, in accordance with some example embodiments.

To further illustrate, FIG. 2A depicts a column of data that is transferred as a value array, in accordance with some example embodiments. As shown in FIG. 2A, in some example embodiments, the database management system 130 may transfer a column of data from an internal table by at least sending, to the client 110, one or more data blocks including, for example, a first data block 210A, a second data block 210B, a third data block 210C, a fourth data block 210D, a fifth data block 210E, a sixth data block 210F, and/or the like. It should be appreciated that the database management system 130 may transfer the column of data by sending, to the client 110, a different quantity of data blocks than shown in FIG. 2A.

Figure 3A:
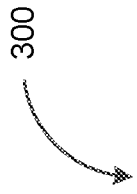
FIG. 3A depicts a table illustrating an example of the contents of metadata that is included in a data chunk, in accordance with some example embodiments.

As noted, in some example embodiments, the database management system 130 may transfer, to the client 110, one or more columns of data from the internal table in the form of a value array without applying any compression to the data in the one or more columns of data. FIG. 2A illustrates the format of the data chunks transferring the value array. For instance, as shown in FIG. 2A, the first data chunk 210A may include a first header 220A, metadata 230, and a null vector 250. FIG. 3A depicts a table 300 illustrating an example of the contents of metadata 230, in accordance with some example embodiments. Meanwhile, FIG. 3B depicts a table 310 illustrating an example of the contents of the first header 220A included in data chunks containing at least a portion of a value array, in accordance with some example embodiments. Furthermore, as shown in FIG. 2A, the first data chunk 210A may include values 240, which may correspond to at least a portion of the value array being transferred to the client 110. However, it should be appreciated that the first data chunk 210A may include the header 220A and the metadata 230 but not the values 240.

In some example embodiments, each data chunk subsequent to the first data chunk 210A may include the first header 220A, the values 240, and the null vector 250. For example, as shown in FIG. 2A, the second data chunk 210B, the third data chunk 210C, the fourth data chunk 210D, the fifth data chunk 210E, and/or the sixth data chunk 210F may each include the first header 220A, the values 240, and the null vector 250.

As noted, the database management system 130 may transfer, to the client 110, data from the database 135 in the form of a value array. Meanwhile, the values 240 may correspond to at least a portion of that value array. In some example embodiments, the values 240 may be associated with a fixed length data type such as, for example, fixed length non-Unicode string (CHAR), fixed length Unicode string (NCHAR), fixed length binary, and/or the like. When the values 240 are associated with a fixed length data type, the values 240 included in each data chunk sent to the client 110 (e.g., the first data chunk 210A, the second data chunk 210B, the third data chunk 210C, the fourth data chunk 210D, the fifth data chunk 210E, and/or the sixth data chunk 210F) may form a simple vector. Alternatively and/or additionally, the values 240 may be associated with a variable length data type such as, for example, variable length non-Unicode string (VARCHAR), variable length binary (VARBINARY), large binary object (LOB), and/or the like. When the values 240 are associated with a variable length data type, each of the values 240, including NULL values, may include the value as well as an additional quantity of bits (e.g., 64-bits and/or another quantity) indicating a length of the value.

Alternatively and/or additionally, the database management system 130 may send fixed length entries and variable length entries in a local dictionary in a fixed quantity of bits (e.g., 64 bits and/or another quantity), although fixed length entries and variable length entries may be written differently. For example, fixed length entries in the local dictionary may be written to match and/or substantially match the format of certain data types including, for example, FTC data types and/or the like. Accordingly, the three fixed length char(10) values "abcdefghij," "1234567890," and "!@#$%^&*( )" may be sent to the client 110 as the simple vector "!@#$%^&*( )234567890abcdefghij." By contrast, three variable length varchar(10) values "123," "abcd," and ")(*&^" may be sent to the client as ")(*&^"{64-bit value 5}"abcd"{64-bit value 4}"123"{64-bit value 3}. As noted, the entry for each variable length varchar(10) value may include the variable length varchar(10) value itself as well as an additional quantity of bits (e.g., a 64-bit and/or another quantity) indicating the length of the value. In some example embodiments, the entries in the local dictionary may be sent to the client 110 in a reverse order, with the first entry occupying an end of a data chunk.

In some example embodiments, the database management system 130 may compress a column of data from the internal table prior to transferring the column of data to the client 110. For instance, as noted, the database management system 130 may apply dictionary compression to the column of data from the internal table. As such, the one or more data chunks that are sent to the client 110 may include a dictionary and/or a corresponding index. For example, the data chunks that are sent to the client 110 may include a global dictionary that enumerates every unique value appearing in the column of data from the internal table followed by an index identifying the rows occupied by each one of the unique values included in the global dictionary. To further illustrate, FIG. 2B depicts a column of data that is transferred using a global dictionary, in accordance with some example embodiments. Referring to FIG. 2B, the first data chunk 210A, the second data chunk 210B, the third data chunk 210C, the fourth data chunk 210D, the fifth data chunk 210E, and/or the sixth data chunk 210F may each include at least a portion of a global dictionary 260 and/or an index 270. For example, the first data chunk 210A, the second data chunk 210B, and/or the third data chunk 210C may each include a portion of the global dictionary 260 while the fourth data chunk 210D, the fifth data chunk 210E, and/or the sixth data chunk 210F may each include at least a portion of the index 270. The global dictionary 260 may enumerate every unique value appearing in a column of data in the internal table. Meanwhile, the index 270 may identify the rows occupied by each one of the unique values included in the global dictionary 250.

Referring again to FIG. 2B, each of the first data chunk 210A, the second data chunk 210B, the third data chunk 210C, the fourth data chunk 210D, the fifth data chunk 210E, and/or the sixth data chunk 210F may also include a second header 220B. FIG. 3D depicts a table 330 illustrating an example of the contents of the second header 220B, in accordance with some example embodiments. As shown in FIG. 2B, the first data chunk 210A may also include the metadata 230 as well as a dictionary header 265. As noted, Table 310 in FIG. 3A illustrates an example of the contents of the metadata 230. Meanwhile, FIG. 3C depicts a table 320 illustrating an example of the contents of the dictionary header 265.

In some example embodiments, at least some of the data chunks transferring a column of data compressed using a global dictionary may include a null vector. For example, as shown in FIG. 2B, the first data chunk 210A may terminate with the null vector 250. Alternatively and/or additionally, each subsequent data chunk that include at least a portion of the index 270 (e.g., the fourth data chunk 210D, the fifth data chunk 210E, and/or the sixth data chunk 210F) may also terminate with the null vector 250. By contrast, the subsequent data chunks that include at least a portion of the global dictionary 260 may not include the null vector 250.

In some example embodiments, the unique values included in the global dictionary 260 may be associated with a fixed length data type such as, for example, fixed length non-Unicode string (CHAR), fixed length Unicode string (NCHAR), fixed length binary, and/or the like. As such, the portion of the global dictionary 260 that is included in the data chunks sent to the client 110 (e.g., the first data chunk 210A, the second data chunk 210B, and/or the third data chunk 210C) may form a simple vector. Alternatively and/or additionally, the unique values included in the global dictionary 260 may be associated with a variable length data type including, for example, variable length non-Unicode string (VARCHAR), variable length binary (VARBINARY), large binary object (LOB), and/or the like. When that is the case, each entry in the global dictionary 260, including entries associated with NULL values, may include a value and an additional quantity of bits (e.g., 64-bits and/or another quantity) indicating a length of the value.

According to some example embodiments, a local dictionary may be used to compress a column of data that is being transferred from the database 135 to the client 110. As noted, the database management system 130 may transfer the column of data to the client 110 by at least sending, to the client 110, one or more data chunks that each contain at least a portion of the column of data. Thus, when a local dictionary is used to compress the column of data, each data chunk may include a local dictionary enumerating every unique value appearing in that data chunk and an index identifying the rows occupied by each one of the unique values included in the local dictionary. To further illustrate, FIG. 2C depicts a column of data that is transferred using one or more local dictionaries, in accordance with some example embodiments. As shown in FIG. 2, the first data chunk 210A, the second data chunk 210B, the third data chunk 210C, the fourth data chunk 210D, the fifth data chunk 210E, and/or the sixth data chunk 210F may include a third header 220C. FIG. 3E depicts a table 340 illustrating an example of the contents of the third header 220C, in accordance with some example embodiments.

Furthermore, FIG. 2C shows each of the first data chunk 210A, the second data chunk 210B, the third data chunk 210C, the fourth data chunk 210D, the fifth data chunk 210E, and/or the sixth data chunk 210F as including a local dictionary and a corresponding index. For instance, the first data chunk 210A may include a first local dictionary 280A and a first index 285A, the second data chunk 210B may include a second local dictionary 280B and a second index 285B, the third data chunk 210C may include a third local dictionary 280C and a third index 285C, the fourth data chunk 210D may include a fourth local dictionary 280D and a fourth index 285D, the fifth data chunk 210E may include a fifth local dictionary 280E and a fifth index 285E, and the sixth data chunk 210F may include a sixth local dictionary 280F and a sixth index 285F. The first local dictionary 280A, the second local dictionary 280B, the third local dictionary 280C, the fourth local dictionary 280D, the fifth local dictionary 280E, and/or the sixth local dictionary 280F may each enumerate the unique values that appear in the corresponding data block. Meanwhile, each of the first index 285A, the second index 285B, the third index 285C, the fourth index 285D, the fifth index 285E, and/or the sixth index 285F may identify the rows that are occupied by each of the unique values included in the corresponding local dictionary.

According to some example embodiments, an index may precede a corresponding local dictionary in each of the first data chunk 210A, the second data chunk 210B, the third data chunk 210C, the fourth data chunk 210D, the fifth data chunk 210E, and/or the sixth data chunk 210F. As such, the database management system 130 may send, to the client 110, an index prior to sending a corresponding local dictionary. Furthermore, the entries included in each of the first local dictionary 280A, the second local dictionary 280B, the third local dictionary 280C, the fourth local dictionary 280D, the fifth local dictionary 280E, and/or the sixth local dictionary 280F may be sent to the client 110 in a reverse order. As such, each of the first data chunk 210A, the second data chunk 210B, the third data chunk 210C, the fourth data chunk 210D, the fifth data chunk 210E, and/or the sixth data chunk 210F may terminate with the first entry from a corresponding local dictionary.

Referring again to FIG. 2C, the first data chunk 210A may also include the metadata 230. As noted, Table 300 from FIG. 3A depicts an example of the contents of the metadata 230. Moreover, as shown in FIG. 2C, unlike data chunks transferring a column of data that has been left uncompressed and/or compressed using a global dictionary, none of the data chunks transferring a column of data compressed using a global dictionary may terminate in the null vector 250. It should also be appreciated that the values included in each local dictionary may be associated with fixed length data types (e.g., fixed length non-Unicode string (CHAR), fixed length Unicode string (NCHAR), fixed length binary, and/or the like) and/or variable length data types (e.g., variable length non-Unicode string (VARCHAR), variable length binary (VARBINARY), large binary object (LOB), and/or the like). When the values in a local dictionary are associated with a fixed length data type, the local dictionary may be sent to the client 110 as a simple vector. By contrast, when the values in a local dictionary are associated with a variable length data type, each entry in that local dictionary, including entries associated with NULL values, may include a value as well as an additional quantity of bits (e.g., 64-bits and/or another quantity) indicating a length of the value.

Figure 4:
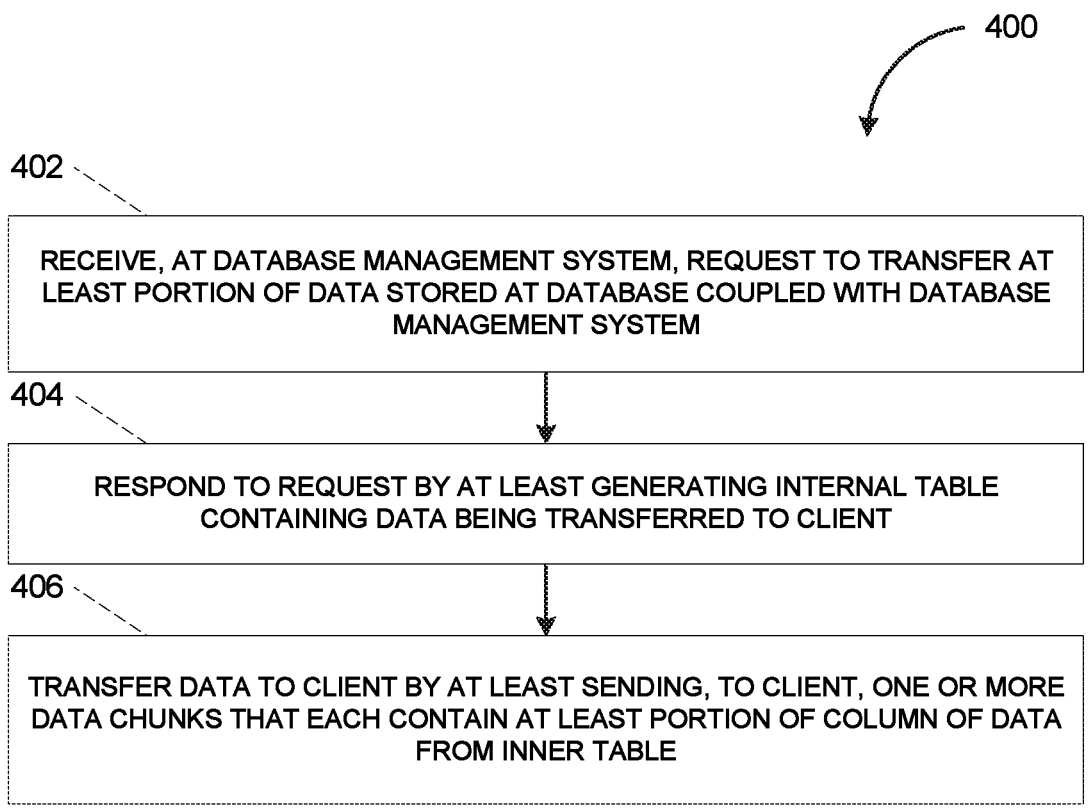
FIG. 4 depicts a flowchart illustrating a process for transferring data from a database, in accordance with some example embodiments.

FIG. 4 depicts a flowchart illustrating a process 400 for transferring data from a database, in accordance with some example embodiments. Referring to FIGS. 1-4, the process 400 may be performed by the database management system 130 in order to transfer at least a portion of the data stored at the database 135. The database management system 130 may transfer the data to any endpoint including, for example, the client 110.

At 402, the database management system 130 may receive a request to transfer, to the client 110, at least a portion of data stored at the database 135 coupled with the database management system. For example, the client 110 may request to transfer at least a portion of data stored at the database 135 by at least requesting to transfer a projection that includes some but not all of the columns of data from the tables stored in the database 135. In some example embodiments, the client 110 may request to transfer data from the database 135 by at least sending, to the database management system 130, a structured query language (SQL) statement such as, for example, a SQL SELECT statement and/or the like. Alternatively and/or additionally, the client 110 may request to transfer data from the database 135 by at least invoking a stored procedure available from the database management system 130.

At 404, the database management system 130 may respond to the request by at least generating an internal table containing the data being transferred to the client 110. In some example embodiments, the database management system 130 may respond to the request from the client 110 by at least generating an internal table for holding the data that is being transferred to the client 110. The internal table may include an x quantity of columns, which may be a same quantity of columns as a projection requested by the client 110. Meanwhile, the database management system 130 may transfer the internal table to the client in a y quantity of columns. As noted, at least some of the y quantity of columns transferred to the client 110 may hold data from the internal table. Alternatively and/or additionally, at least one of the y quantity of columns transferred to the client 110 may hold a summary of the data that is being transferred to the client 110. For instance, the summary of the data may include a JavaScript Object Notation (JSON) description of the data that is being transferred to the client 110 including, for example, any errors that may be present in the data.

At 406, the database management system 130 may transfer the data to the client 110 by at least sending, to the client 110, one or more data chunks that each contain at least a portion of a column of data from the internal table. In some example embodiments, the database management system 130 may transfer the data requested by the client 110 by at least sending, to the client, one or more data chunks including, for example, the first data chunk 210A, the second data chunk 210B, the third data chunk 210C, the fourth data chunk 210D, the fifth data chunk 210E, and/or the sixth data chunk 210F. Each of the first data chunk 210A, the second data chunk 210B, the third data chunk 210C, the fourth data chunk 210D, the fifth data chunk 210E, and/or the sixth data chunk 210F may contain at least a portion of a column from the internal table.

In some example embodiments, the database management system 130 may transfer, to the client 110, a column of data from the internal table without first compressing the column of data. Thus, as shown in FIG. 2A, the first data chunk 210A, the second data chunk 210B, the third data chunk 210C, the fourth data chunk 210D, the fifth data chunk 210E, and/or the sixth data chunk 210F may include at least a portion of a value array corresponding to corresponding to the column of data without being subject to any compression. Alternatively and/or additionally, the database management system 130 may apply one or more compression techniques to the column of data prior to transferring the column of data to the client 110. Accordingly, FIGS. 2B-C show each of the first data chunk 210A, the second data chunk 210B, the third data chunk 210C, the fourth data chunk 210D, the fifth data chunk 210E, and/or the sixth data chunk 210F as including at least a portion of a dictionary and/or a corresponding index.

For instance, as shown in FIG. 2B, when the column of data is compressed using the global dictionary 260, some of the data chunks may include at least a portion of the global dictionary 260 while other data chunks may include at least a portion of the corresponding index 270. The global dictionary 260 may enumerate every unique value appearing in the column of data while the index 270 may identify the rows occupied by each of the unique values included in the global dictionary 260. By contrast, when the column of data is compressed using one or more local dictionaries, FIG. 2C shows each data chunk as including a local dictionary enumerating the unique values appearing in a data chunk and an index identifying the rows occupied by the unique values included in the local dictionary.

According to some example embodiments, the database management system 130 may transfer the data requested by the client 110 in a synchronized mode, for example, when the client 110 is performing a processing task that operates on one row of data at a time. Transferring data to the client 110 in a synchronized mode may include sending, to the client 110, a data chunk from each column in the internal table. In order to ensure that the client 110 is able to form at least one complete row of data upon receiving a certain quantity of data chunks, a data chunk may be sent to the client 110 even when that data chunk is only partially full. Alternatively and/or additionally, the database management system 130 may transfer the data requested by the client 110 in an unsynchronized mode, which may reduce at least some of the overhead associated with transferring the data in a synchronized mode. Transferring data to the client 110 in an unsynchronized mode may include sending, to the client 110, a data chunk only when that data chunk is full, regardless of the order in which the columns from the internal table arrive at the client 110. As such, when the database management system 130 is transferring data in an unsynchronized mode, there is no guarantee that the client 110 will be able to form at least one complete row of data upon receiving a certain quantity of data chunks.

Figure 5:
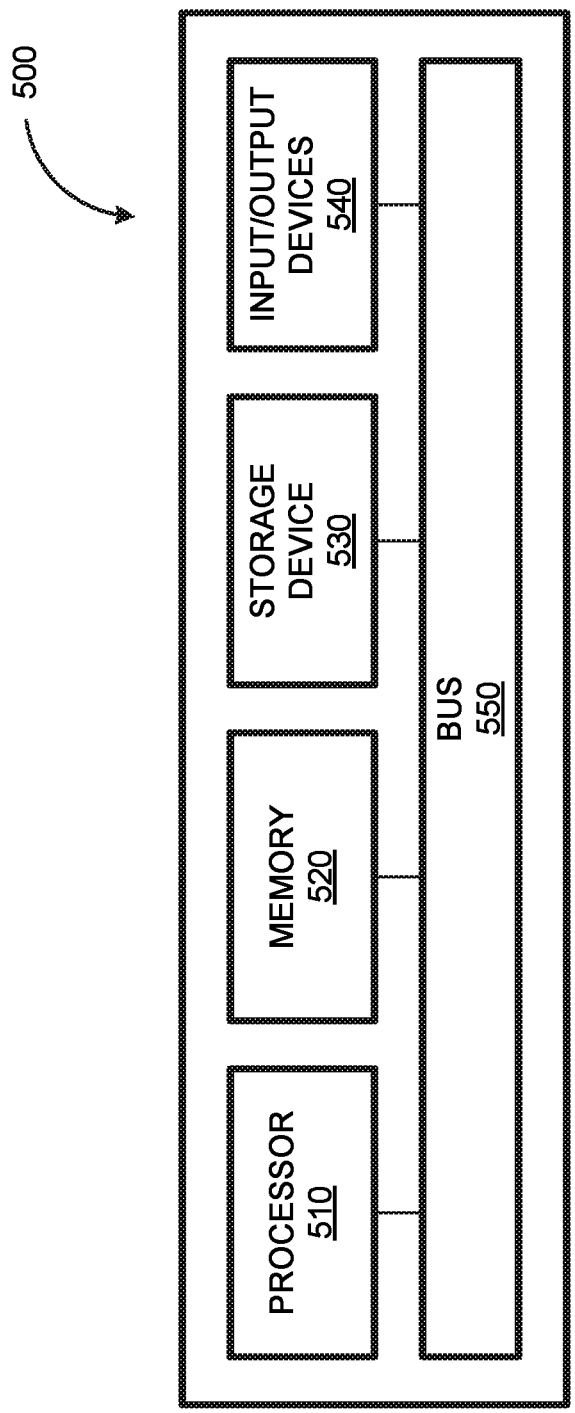
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the database management system 130 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the database management system 110. In some example embodiments, the processor 510 can be a single-threaded processor. Alternatively and/or additionally, the processor 510 may be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid state drive, and/or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing items and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program item, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   receiving, at a database management system, a request to transfer, to a client device, data stored at a database coupled with the database management system;
   responding to the request by at least generating an internal table containing the data being transferred to the client device, wherein the internal table includes a quantity of columns corresponding to at least one of: processing capabilities of the client device, and processing tasks being performed by the client; and
   transferring the data to the client device by at least sending, to the client device, one or more data chunks, each of the one or more data chunks including at least a portion of a column of data from the internal table, each of the one or more data chunks including, based at least on the request indicating that the data transferred to the client device is to be compressed, at least one of: a portion of a dictionary, and at least a portion of an index corresponding to the one or more data chunks;
   wherein in response to the data being transferred in a synchronized mode, the transferring of the data includes sending a data chunk from each column of the internal table when the one or more data chunks are at least partially full, and forming a complete row of data from the internal table at the client device when the data chunk from each column of the internal table is at least partially full, and
   wherein in response to the data being transferred in an unsynchronized mode, the transferring of the data includes sending the data chunk from each column of the internal table upon determining the data chunk from each column of the internal table is full.

2. The system of claim 1, wherein at least some of the one or more data chunks include a value array comprising the column of data from the internal table based at least on the request indicating that the data transferred to the client device is to be uncompressed.

3. The system of claim 1, further comprising:
   generating the data chunk by compressing the column of data, the column of data compressed by generating at least one of: the dictionary and the index corresponding to the data chunk, the dictionary enumerating one or more unique values appearing in the column of data, and the index identifying one or more rows occupied by each of the one or more unique values.

4. The system of claim 3,
   wherein the dictionary comprises a global dictionary enumerating unique values that appear in the column of data.

5. The system of claim 1,
   wherein the one or more data chunks include a first data chunk and a second data chunk, wherein the first data chunk includes at least the portion of the dictionary, and wherein the second data chunk includes at least the portion of the index corresponding to the second data chunk.

6. The system of claim 3, wherein the dictionary comprises a first local dictionary and a second local dictionary, wherein the first local dictionary enumerates unique values appearing in a first data chunk from the one or more data chunks, and wherein the second local dictionary enumerates unique values appearing in a second data chunk from the one or more data chunks.

7. The system of claim 6, wherein the first data chunk includes the first local dictionary and a first index identifying rows occupied by the unique values enumerated in the first local dictionary, and wherein the second data chunk includes the second local dictionary and a second index identifying rows occupied by the unique values enumerated in the second local dictionary.

8. The system of claim 1,
   wherein a first data chunk and a second data chunk from the one or more data chunks include data from a first column of data in the internal table, wherein a third data chunk from the one or more data chunks includes data from a second column of data in the internal table, and wherein the transferring of the data in the synchronized mode includes sending the third data chunk prior to the second data chunk, and forming the complete row of data from the internal table.

9. The system of claim 1, wherein the request for data from the database comprises at least one of a structured query language (SQL) query and an invocation of a stored procedure at the database management system, and wherein at least a portion of data requested from the database comprises a projection of one or more tables stored at the database.

10. A computer-implemented method, comprising:
    receiving, at a database management system, a request to transfer, to a client device, data stored at a database coupled with the database management system;
    responding to the request by at least generating an internal table containing the data being transferred to the client device, wherein the internal table includes a quantity of columns corresponding to at least one of: processing capabilities of the client device, and processing tasks being performed by the client; and
    transferring the data to the client device by at least sending, to the client device, one or more data chunks, each of the one or more data chunks including at least a portion of a column of data from the internal table, each of the one or more data chunks including, based at least on the request indicating that the data transferred to the client device is to be compressed, at least one of: a portion of a dictionary, and at least a portion of an index corresponding to the one or more data chunks;

wherein in response to the data being transferred in a synchronized mode, the transferring of the data includes sending a data chunk from each column of the internal table when the one or more data chunks are at least partially full, and forming a complete row of data from the internal table at the client device when the data chunk from each column of the internal table is at least partially full, and wherein in response to the data being transferred in an unsynchronized mode, the transferring of the data includes sending the data chunk from each column of the internal table upon determining the data chunk from each column of the internal table is full.

11. The method of claim 10, wherein at least some of the one or more data chunks include a value array comprising the column of data from the internal table based at least on the request indicating that the data transferred to the client device is to be uncompressed.

12. The method of claim 10, further comprising:
generating the data chunk by compressing the column of data, the column of data compressed by generating at least one of: the dictionary and the index corresponding to the data chunk, the dictionary enumerating one or more unique values appearing in the column of data, and the index identifying one or more rows occupied by each of the one or more unique values.

13. The method of claim 12,
wherein the dictionary comprises a global dictionary enumerating unique values that appear in the column of data.

14. The method of claim 10,
wherein the one or more data chunks include a first data chunk and a second data chunk, wherein the first data chunk includes at least the portion of the dictionary, and wherein the second data chunk includes at least the portion of the index corresponding to the second data chunk.

15. The method of claim 12, wherein the dictionary comprises a first local dictionary and a second local dictionary, wherein the first local dictionary enumerates unique values appearing in a first data chunk from the one or more data chunks, and wherein the second local dictionary enumerates unique values appearing in a second data chunk from the one or more data chunks.

16. The method of claim 15, wherein the first data chunk includes the first local dictionary and a first index identifying rows occupied by the unique values enumerated in the first local dictionary, and wherein the second data chunk includes the second local dictionary and a second index identifying rows occupied by the unique values enumerated in the second local dictionary.

17. The method of claim 10,
wherein a first data chunk and a second data chunk from the one or more data chunks include data from a first column of data in the internal table, wherein a third data chunk from the one or more data chunks includes data from a second column of data in the internal table, and wherein the transferring of the data in the synchronized mode includes sending the third data chunk prior to the second data chunk, and forming the complete row of data from the internal table.

18. A non-transitory computer readable medium storing instructions, which when executed by at least one data processor, result in operations comprising:
receiving, at a database management system, a request to transfer, to a client device, data stored at a database coupled with the database management system;

responding to the request by at least generating an internal table containing the data being transferred to the client device, wherein the internal table includes a quantity of columns corresponding to at least one of: processing capabilities of the client device, and processing tasks being performed by the client; and transferring the data to the client device by at least sending, to the client device, one or more data chunks, each of the one or more data chunks including at least a portion of a column of data from the internal table, each of the one or more data chunks including, based at least on the request indicating that the data transferred to the client device is to be compressed, at least one of: a portion of a dictionary, and at least a portion of an index corresponding to the one or more data chunks;

wherein in response to the data being transferred in a synchronized mode, the transferring of the data includes sending a data chunk from each column of the internal table when the one or more data chunks are at least partially full, and forming a complete row of data from the internal table at the client device when the data chunk from each column of the internal table is at least partially full, and wherein in response to the data being transferred in an unsynchronized mode, the transferring of the data includes sending the data chunk from each column of the internal table upon determining the data chunk from each column of the internal table is full.

* * * * *